United States Patent [19]

Inagaki

[11] Patent Number: 5,640,324
[45] Date of Patent: Jun. 17, 1997

[54] DYNAMIC BEHAVIOR CONTROL APPARATUS OF AUTOMOTIVE VEHICLE

[75] Inventor: Shoji Inagaki, Susono, Japan

[73] Assignee: Toyota Jidosha Kabushiki Kaisha, Aichi-ken, Japan

[21] Appl. No.: 379,214

[22] Filed: Jan. 27, 1995

[30] Foreign Application Priority Data

Feb. 2, 1994 [JP] Japan .................................. 6-010977

[51] Int. Cl.$^6$ ...................................................... B60T 8/32
[52] U.S. Cl. ................. 364/426.01; 364/424.046; 364/426.014; 280/707; 180/197
[58] Field of Search ...................... 364/426.01, 424.01, 364/424.05, 426.02, 426.03; 280/707; 180/197; 303/116.1

[56] References Cited

U.S. PATENT DOCUMENTS

| | | | |
|---|---|---|---|
| 4,767,588 | 8/1988 | Ito | 364/424.05 |
| 4,961,595 | 10/1990 | Fukushima et al. | 280/707 |
| 5,540,488 | 7/1996 | Terazawa et al. | 303/116.1 |

FOREIGN PATENT DOCUMENTS

2-109711  4/1990  Japan .

*Primary Examiner*—Gary Chin
*Attorney, Agent, or Firm*—Oliff & Berridge

[57] ABSTRACT

A dynamic behavior control apparatus of an automotive vehicle wherein a side slip angle and its angular velocity are detected to determine whether a dynamic state of the vehicle defined by the detected side slip angle and its angular velocity is in a stable region or an unstable region, and wherein an unstable degree of the dynamic state of the vehicle is calculated. As a result of the detection and calculation, each target braking force of front and rear road wheels of the vehicle is calculated for correction of unstable behavior of the vehicle. A boundary line of the stable and unstable regions is varied in accordance with a driving condition amount of the vehicle such as a vehicle speed, a steering angle and a steering angle velocity and a travel circumstance amount such as a road surface frictional coefficient.

5 Claims, 6 Drawing Sheets

DYNAMIC BEHAVIOR CONTROL APPARATUS OF AUTOMOTIVE VEHICLE

BACKGROUND OF THE INVENTION

1. Field of the Invention

The present invention relates to a dynamic behavior control apparatus of an automotive vehicle for stabilizing unstable behavior of the vehicle such as drift-out, spin or the like.

2. Discussion of the Prior Art

Disclosed in Japanese Patent Laid-open Publication No. 2-109711 is a dynamic behavior control apparatus of this kind wherein a side slip angle and its angular velocity of an automotive vehicle are detected to vary roll stiffness distribution of the vehicle in a fore-and-aft direction under control of the vehicle suspension if a dynamic state of the vehicle defined by the detected side slip angle and its angular velocity is in an unstable region.

In the conventional control apparatus as described above, however, the unstable region and the correction amount of the roll stiffness distribution ratio are fixed. For this reason, the correction control of unstable behavior of the vehicle would be effected in the same manner even if a driving condition of the vehicle such as a vehicle speed, a steering angle, a steering angle velocity or the like, a travel circumstance of the vehicle such as a frictional coefficient of the travel road surface and/or an unstable degree of the vehicle were changed.

SUMMARY OF THE INVENTION

It is, therefore, a primary object of the present invention to provide an improved dynamic behavior control apparatus of an automotive vehicle capable of effecting correction control of unstable behavior of the vehicle in accordance with driving conditions, travel circumstances and an unstable degree of the vehicle.

According to the present invention, the object is accomplished by providing a dynamic behavior control apparatus of an automotive vehicle having a behavior control device capable of stabilizing unstable behavior of the vehicle, first detection means for detecting a side slip angle of the vehicle, second detection means for detecting a side slip angular velocity of the vehicle, and electric control means for controlling operation of the behavior control device when a dynamic state of the vehicle defined by the detected side slip angle and its angular velocity is in an unstable region, wherein the dynamic behavior control apparatus comprises third detection means for detecting a driving condition amount related to stability of the vehicle in a lateral direction, and means for varying the unstable region in accordance with the detected driving condition amount.

According to another aspect, there is provided a dynamic behavior control apparatus of an automotive vehicle having a behavior control device capable of stabilizing unstable behavior of the vehicle, first detection means for detecting a side slip angle of the vehicle, second detection means for detecting a side slip angular velocity of the vehicle, and electric control means for controlling operation of the behavior control device when a dynamic state of the vehicle defined by the detected side slip angle and its angular velocity is in an unstable region, wherein the dynamic behavior control apparatus comprises third detection means for detecting a travel circumstance condition amount related to stability of the vehicle in a lateral direction, and means for varying the unstable region in accordance with the detected travel circumstance condition amount.

According to a further aspect of the present invention, there is provided a dynamic behavior control apparatus of an automotive vehicle having a behavior control device capable of stabilizing unstable behavior of the vehicle, first detection means for detecting a side slip angle of the vehicle, second detection means for detecting a side slip angular velocity of the vehicle, and electric control means for controlling operation of the behavior control device when a dynamic state of the vehicle defined by the detected side slip angle and its angular velocity is in an unstable region, wherein said electric control means comprises calculation means for calculating an unstable degree of the dynamic state of the vehicle; determination means for determining a control amount which is increased in accordance with an increase of the unstable degree; and output means for producing an electric control signal indicative of the control amount and applying it to said electric control means.

BRIEF DESCRIPTION OF THE DRAWINGS

Other objects, features and advantages of the present invention will be more readily appreciated from the following detailed description of a preferred embodiment thereof when taken together with reference to the accompanying drawings, in which.

DESCRIPTION OF THE PREFERRED EMBODIMENT

Figure 6:
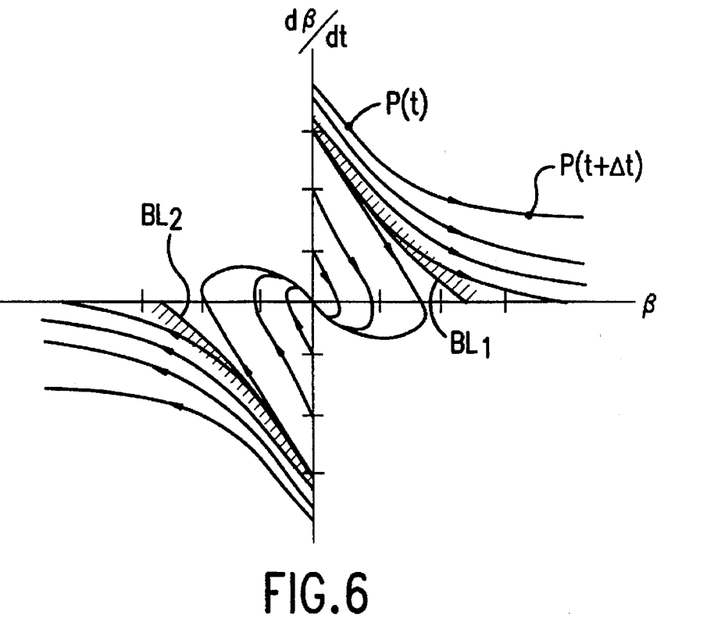
FIG. 6 is a graph showing a dynamic state of the vehicle in relation to a side slip angle and its angular velocity.

First of all, a control method underlying the concept of the present invention will be briefly described with reference to FIGS. 6 to 8. Illustrated in FIG. 6 are changing conditions of a side slip angle β and its angular velocity dβ/dt in a condition where an automotive vehicle is traveling at an initial speed 80 km/h on a travel road of a constant frictional coefficient without being applied with any steering input. For instance, a dynamic state P(t) of the vehicle defined by a current side slip angle β and its angular velocity dβ/dt changes in accordance with lapse of a time in a direction shown by an arrow in the figure and becomes a dynamic state P(t+Δt). As is understood from the figure of FIG. 6, if each absolute value of the side slip angle β and its angular velocity dβ/dt is small, the dynamic state of the vehicle will converge to an original point 0 in accordance with lapse of a time. However, if each absolute value of the side slip angle β and its angular velocity dβ/dt is large, the dynamic state of the vehicle will change to increase the absolute value of the side slip angle β in accordance with lapse of a time. Accordingly, the dynamic state of the vehicle defined by the side slip angle β and its angular velocity dβ/dt is divided by non-linear boundary lines BL1, BL2 into a stable region and an unstable region (a portion indicated by hatching lines).

Figure 7:
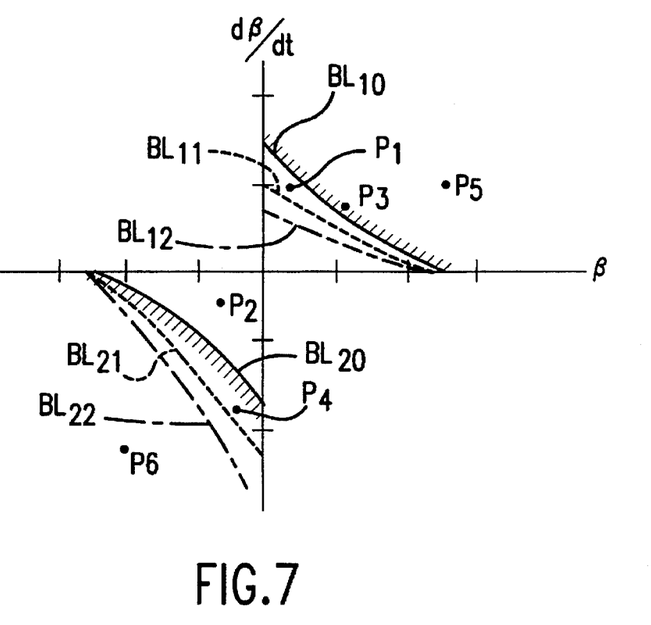
FIG. 7 is a graph showing variation of a boundary line of a stable region and an unstable region of the dynamic state of the vehicle.
Figure 8:
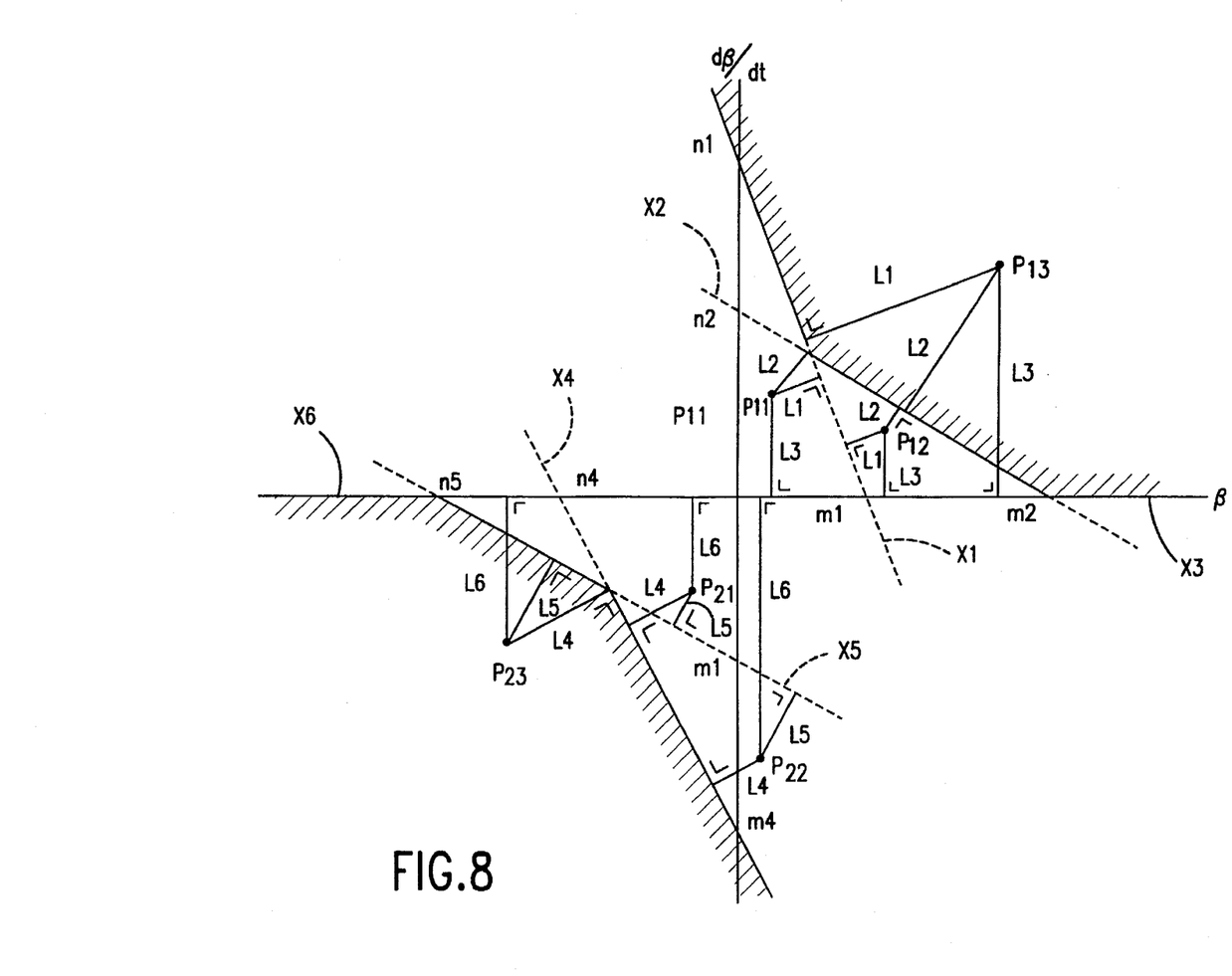
FIG. 8 is a coordinate showing the boundary line of the stable and unstable regions in the form of an approximate straight line.

In FIG. 7, there are illustrated changing conditions of the side slip angle and its angular velocity when the vehicle has been applied with a steering input, wherein the boundary lines of the stable and unstable regions are represented by solid lines BL10, BL20, respectively, if a positive steering angle (for instance, 4 degrees) in the same direction as the side slip angle β is applied, the boundary lines BL10, BL20 will change as shown by broken lines BL11, BL21. If a positive steering angle (for instance, 6 degrees) is further applied, the boundary lines will change as shown by dot and dash lines BL12, BL22. Thus, the unstable region will increase if the vehicle is steered in the same direction as the side slip angle β and will decrease if the vehicle is steered in the opposite direction against the side slip angle β. Since the boundary lines vary in dependence upon the steering angle velocity, the unstable region will increase if the steering angle velocity increases in the same direction as the side slip angle β and will decrease if the steering angle velocity increases in the opposite direction against the side slip angle β. In addition, the boundary lines of the stable and unstable regions vary in dependence upon an increase of the vehicle speed and the frictional coefficient of the road surface.

Hereinafter, the control method for correction of the vehicle behavior will be described on a basis of a result of the foregoing analysis. Boundary lines shown by solid lines in FIG. 7 are preliminarily determined to be varied in accordance with driving conditions of the vehicle such as the travel speed, steering angle and steering angle velocity related to stability of the vehicle in a lateral direction and travel circumstances of the vehicle such as a road surface frictional coefficient related to stability of the vehicle in the lateral direction. When the dynamic state of the vehicle is in the stable region as represented by P1, P2 in FIG. 7, any correction of the vehicle behavior is not effected. When the dynamic state of the vehicle is in the unstable region as represented by P3, P4, P5 or P6 in FIG. 7, correction of the vehicle behavior is effected. If the unstable degree of the dynamic state of the vehicle is large as represented by P5 or P6 in FIG. 7, a control amount for correction of the vehicle behavior is made larger than that in the dynamic state of the vehicle in the unstable degree of which is small as represented by P3 or P4 in FIG. 7, in this instance, as shown in FIG. 8, the boundary lines may be approximated to fold lines respectively composed of straight lines X1–X3, X4–X6. The straight lines X3, X6 each are defined as an x-axis, and the straight lines X1, X2 and X3, X4 are defined by respective segments m1, n1; m2, n2; m4, n4; m5, n5 intersecting the x and y axes. The segments m1,n1; m2, n2; m4, n4; m5, n5 are changed in accordance with the driving conditions and travel circumstances of the vehicle to vary the boundary lines.

For determining whether the dynamic state of the vehicle is in a stable region or an unstable region, each vertical distance from the dynamic state of the vehicle to the straight lines X1–X6 is calculated as described below. Each dynamic state P(β, dβ/dt) of the vehicle on the straight lines X1, X2, X4, X5 satisfies the following equation (1), and each vertical distance L (L1, L2, L4, L5) from the dynamic state of the vehicle to the straight lines X1, X2, X4, X5 is calculated by the following equation (2).

$$\frac{\beta}{mj} + \frac{(d\beta/dt)}{nj} - 1 = 0 \qquad (1)$$

$$L = \frac{mj \cdot nj}{(mj^2 + nj^2)^{1/2}} \cdot \left( \frac{\beta}{mj} + \frac{(d\beta/dt)}{nj} - 1 \right) \qquad (2)$$

In the equations (1) and (2), the character j represents 1, 2, 4, 5, and the distance L is represented as a negative value when the dynamic state P(β, dβ/dt) is in the side of the original point 0 with respect to the straight lines X1, X2, X4, X5 and represented as a positive value when the dynamic state P(β, dβ/dt) of the vehicle is in the opposite side to the original point 0 with respect to the straight lines X1, X2, X4, X5. The distance L (L3, L4) from the dynamic state P(β, dβ/dt) of the vehicle to the straight lines X4, X6 is calculated as |dβ/dt|.

When the side slip angular velocity dβ/dt is more than "0", a minimum value Lm=MIN(L1, L2, L3) of the respective vertical distances L1, L2, L3 from the dynamic state P(β, dβ/dt) to the straight lines X1, X2, X3 is calculated to determine the dynamic state P of the vehicle as follows:

1) If the minimum value Lm is negative, the dynamic state P of the vehicle is in a stable region.
2) If the minimum value Lm is positive, the dynamic state P of the vehicle is in an unstable region.
3) The unstable degree of the dynamic state P is determined by the positive minimum value Lm.

For instance, if the dynamic state P of the vehicle is defined by a point P11 in the stable region, the distance L3 becomes positive whereas the distances L1, L2 become negative. Thus, the minimum value Lm is defined by the distance L2 to represent the stable region. If the dynamic state P of the vehicle is defined by a point P12 in the stable region, the distances L1, L3 become positive whereas the distance L2 becomes negative. Thus, the minimum value Lm is defined by the distance L2 to represent the stable region. If the dynamic state P of the vehicle is defined by a point P13 in the unstable region, all the distances L1, L2, L3 become positive. Thus, the minimum value Lm is defined by the distance L2 to represent an unstable degree of the dynamic state of the vehicle.

When the side slip angular velocity dβ/dt is less than "0", a minimum value Lm=MIN(L4, L5, L6) of the vertical distances L4, L5, L6 from the dynamic state P(β, dβ/dt) to the straight lines X4, X5, X6 is calculated to determine the dynamic state P of the vehicle in the same manner as described above. For instance, if the dynamic state P of the vehicle is defined by a point P21 in the stable region, the distance L6 becomes positive whereas the distances L4, L5 become negative. Thus, the minimum valve Lm is defined by the distance L4 to represent the stable region. If the dynamic state P of the vehicle is defined by a point P22 in the stable region, the distances L5, L6 become positive whereas the distance L4 becomes negative. Thus, the minimum value Lm is defined by the distance L4 to represent the stable region. If the dynamic state P of the vehicle is defined by a point P23 in the unstable region, all the distances L4, L5, L6 become positive. Thus, the minimum value Lm is defined by the distance L5 to represent an unstable degree of the dynamic state P of the vehicle.

Figure 1:
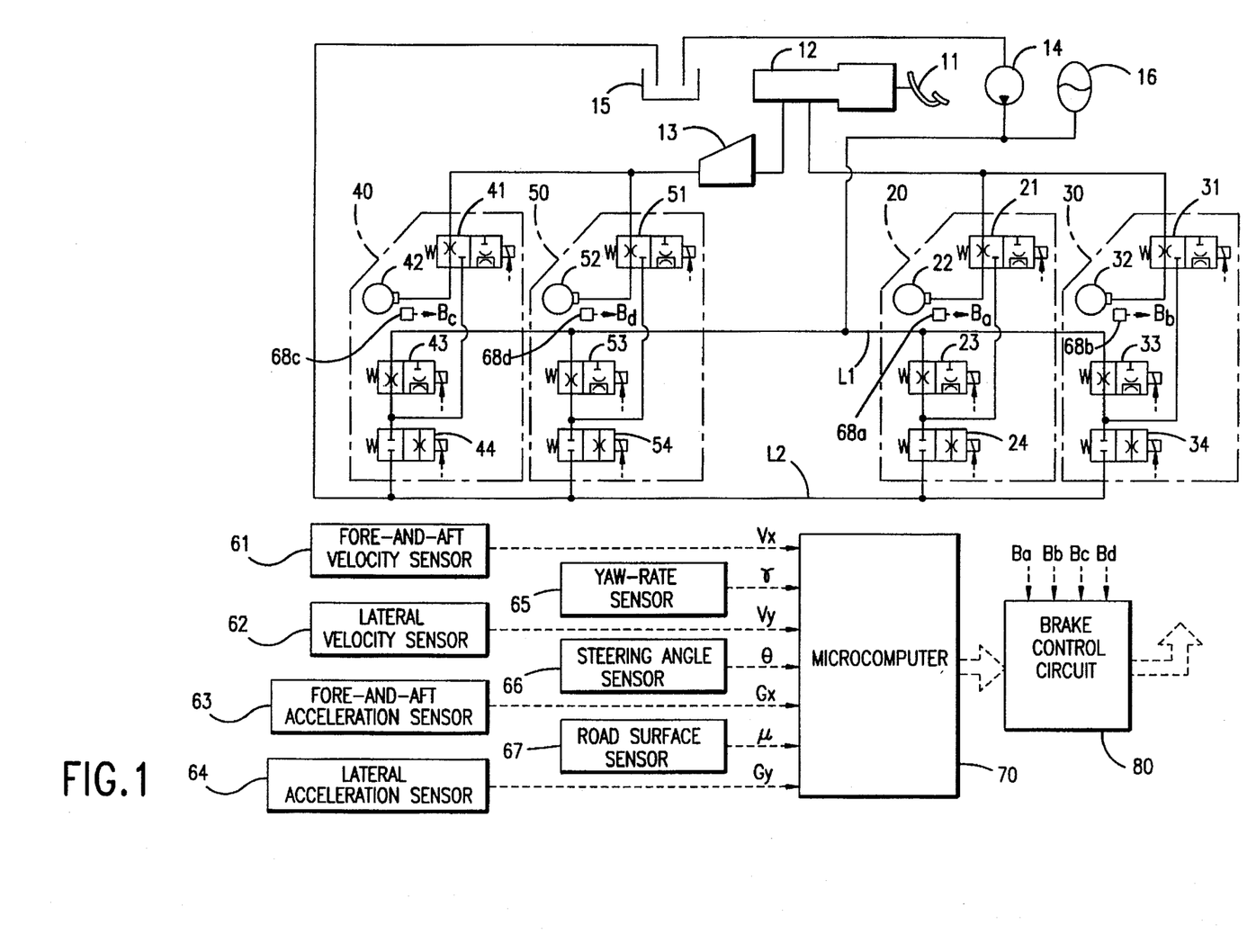
FIG. 1 is a schematic illustration of a hydraulic brake control system of an automotive vehicle and an electric control apparatus for the brake control system.

Hereinafter, a preferred embodiment of a dynamic behavior control apparatus of an automotive vehicle according to the present invention will be described with reference to FIG. 1. In this embodiment, the dynamic behavior control apparatus is in the form of a hydraulic brake control system of the vehicle which includes a master cylinder 12 arranged to be operated by depression of a brake pedal 11. The master cylinder 12 has a first port connected to slave cylinders 22, 32 of left and right front road wheels through solenoid valves 21, 31 and a second port connected to slave cylinders 42, 52 of left and right rear road wheels through a proportioning valve 13 and solenoid valves 41, 51.

The hydraulic brake control system includes a hydraulic pump 14 arranged to pump out hydraulic fluid from a fluid reservoir 15 and to supply hydraulic fluid under pressure to a high pressure line L1. The high pressure line L1 is provided with an accumulator 16 for accumulating the hydraulic fluid under pressure therein. Disposed between the high pressure line L1 and a low pressure line L2 in connection to the reservoir 15 are braking pressure control devices 20, 30, 40 and 50 respectively for the front and rear road wheels. The hydraulic braking pressure control device 20 for the left front road wheel includes the solenoid valve 21, the slave cylinder 22, a pressure increasing solenoid valve 23 and a pressure reducing solenoid valve 24. The solenoid valve 23 is arranged to communicate the high pressure line L1 with the slave cylinder 22 therethrough when it is retained in a first position shown in the figure in a condition where the solenoid valve 21 has been switched over to a second position from a first position shown in the figure. When switched over to a second position from the first position, the solenoid valve 23 interrupts the fluid communication between the high pressure line L1 and the slave cylinder 22. The pressure reducing solenoid valve 24 is arranged to communicate the slave cylinder 22 with the low pressure line L2 therethrough when it is switched over to a second position from a first position shown in the figure in a condition where the solenoid valve 21 has been switched over to the second position. When retained in the first position, the solenoid valve 24 interrupts the fluid communication between the slave cylinder 22 and the low pressure line L2.

The hydraulic braking pressure control device 30 for the right front road wheel includes the solenoid valve 31, the slave cylinder 32, a pressure increasing solenoid valve 33 and a pressure reducing valve 34 which are arranged in the same manner as in the braking pressure control device 20. Similarly, the braking pressure control device 40 for the left rear road wheel includes the solenoid valve 41, the slave cylinder 42, a pressure increasing solenoid valve 43 and a pressure reducing solenoid valve 44 which are arranged in the same manner as in the braking pressure control device 20. The hydraulic braking pressure control device 50 for the right rear road wheel includes the solenoid valve 51, the slave cylinder 52, a pressure increasing solenoid valve 53 and a pressure reducing solenoid valve 54 which are arranged in the same manner as in the braking pressure control device 20, in this embodiment, all the solenoid valves are retained in their first positions when they are deenergized and switched over from their first positions to their second positions when they are energized.

An electric control apparatus for the solenoid valves includes a fore-and-aft velocity sensor 61, a lateral velocity sensor 62, a fore-and-aft acceleration sensor 63, a lateral acceleration sensor 64, a yaw rate sensor 65, a steering angle sensor 66, a road surface frictional coefficient sensor 67 and hydraulic pressure sensors 68a–68d. The sensors 61–67 are arranged to detect a fore-and-aft velocity Vx, a lateral velocity Vy, a fore-and-aft acceleration Gx, a lateral acceleration Gy, a yaw rate γ, a steering angle θ of the front road wheels and a road surface frictional coefficient μ, respectively. The fore-and-aft velocity Vx and acceleration Gx each are represented as a positive value in a physical amount in the forward direction and as a negative value in a physical amount in the backward direction. The lateral velocity Vy, lateral acceleration Gy, yaw rate γ and steering angle θ each are represented as a positive value in the rightward direction and as a negative value in the leftward direction.

The road surface frictional coefficient sensor 67 is arranged to detect a frictional coefficient μ of the vehicle tires on a road surface and to produce an electric signal indicative of the detected frictional coefficient μ. For example, the following detection devices can be adapted as the frictional coefficient sensor 67.

1) A detection device arranged to estimate a road surface frictional coefficient μ based on the fuzzy theory using a condition amount of a portion of the vehicle such as a torque of a steering shaft, a tie rod axial tension, etc. variable in turning of the vehicle, a condition amount of the vehicle such as a fore-and-aft acceleration, a road wheel speed, etc. variable in braking or driving of the vehicle, and a condition amount related to a weather condition such as humidity, outside temperature, etc.

2) A detection device arranged to detect a road surface reaction by measurement of a tie rod axial tension, a hydraulic pressure in a power steering device, etc. thereby to estimate a road surface frictional coefficient based on the detected road surface reaction, a vehicle speed and a steering angle.

3) A detection device arranged to estimate a road surface frictional coefficient μ based on a yaw rate γ (a lateral acceleration), a vehicle speed and a steering angle.

4) A detection device arranged to detect a road surface frictional coefficient μ based on a vector sum of a lateral acceleration and a fore-and-aft acceleration at start of slip.

5) A detection device arranged to calculate a road surface frictional coefficient μ based on a slip ratio of an additional road wheel mounted on the vehicle and preliminarily applied with a predetermined braking force to be engaged with a road surface.

The hydraulic pressure sensors 68a–68d each are arranged to measure a braking pressure applied to the respective slave cylinders 22, 23, 24, 25 thereby to produce electric signals indicative of braking pressures Ba–Bd applied to the road wheels. The sensors 61–67 are connected to a microcomputer 70 which is designed to execute a control program shown by a flow chart in FIG. 2 for determining a dynamic state of the vehicle defined by a side slip angle β and its angular velocity dβ/dt and for producing a control signal for automatically correcting the dynamic state of the vehicle if the dynamic state of the vehicle is in an unstable region. A brake control circuit 80 is connected to the hydraulic pressure sensors 68a–68d and to the computer 70 to energize or deenergize the solenoid valves 21, 23, 24, 31, 33, 34, 41, 43, 44, 51, 53, 54 in response to the control signal applied thereto from the computer 70 for control of hydraulic fluid under pressure applied to and discharged from the slave cylinders 22, 32, 42, 52.

Figure 2:
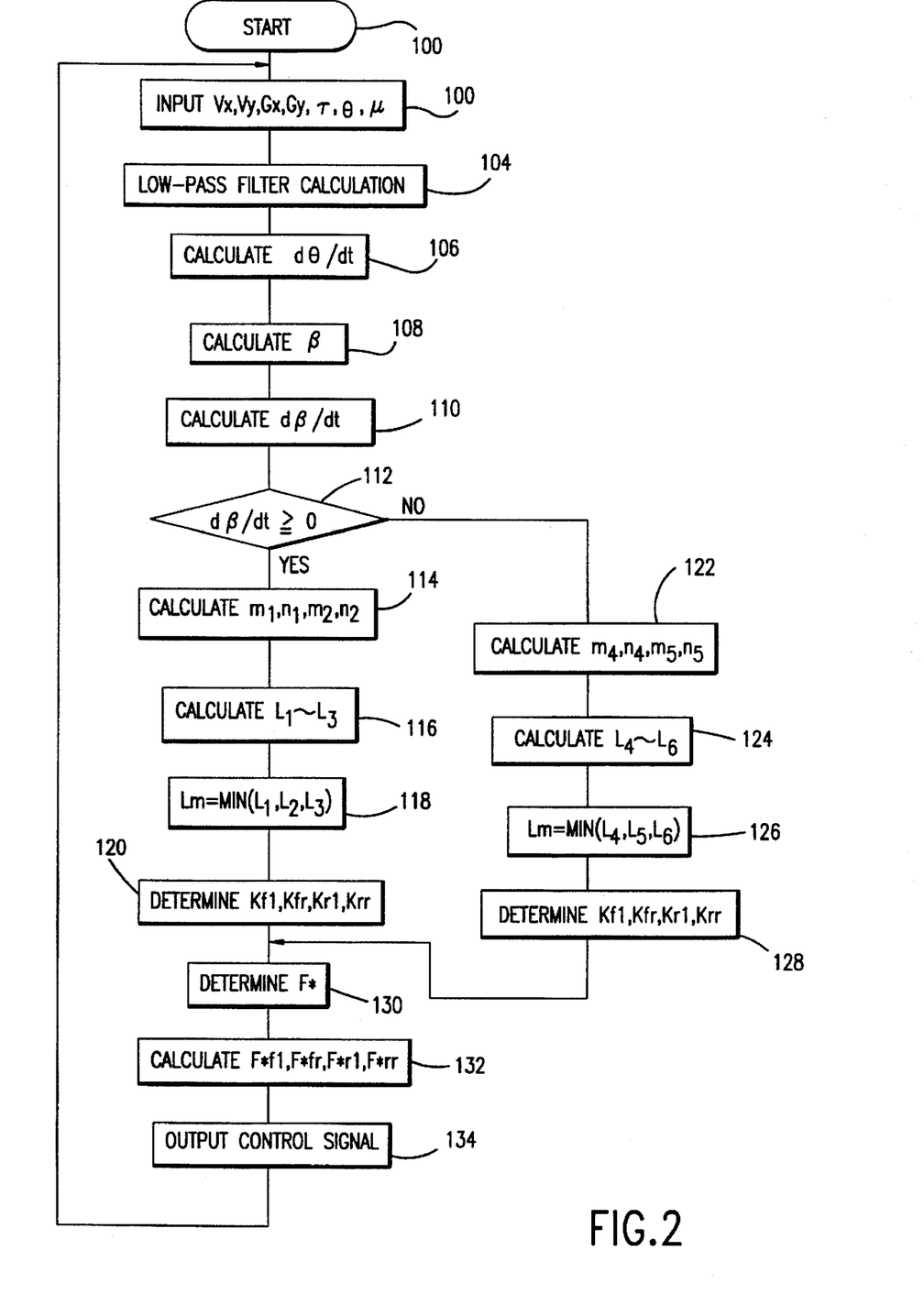
FIG. 2 is a flow chart of a control program executed by a microcomputer shown in FIG. 1.
Figure 3A:
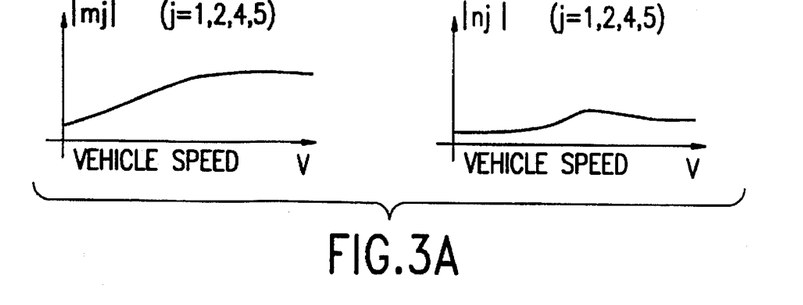
FIG. 3(A) is a set of graphs respectively showing an x-axis segment and a y-axis segment of a straight line in relation to a vehicle speed, wherein the straight line is approximated to a boundary line of a stable region and an unstable region of the vehicle dynamic state.
Figure 3B:
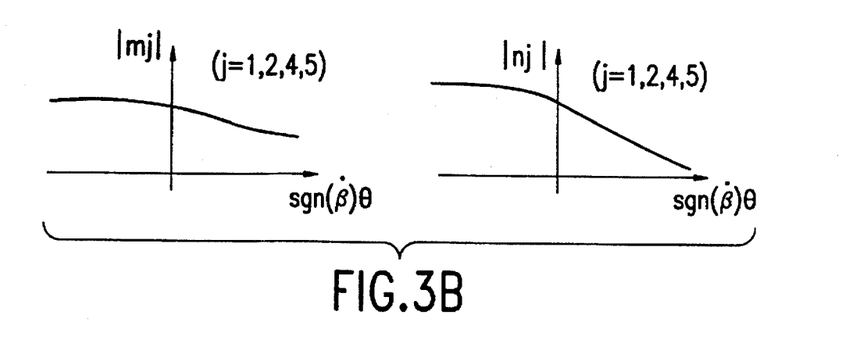
FIG. 3(B) is a set of graphs respectively showing the x-axis segment and y-axis segment in relation to a steering angle of the front road wheels of the vehicle.
Figure 3C:
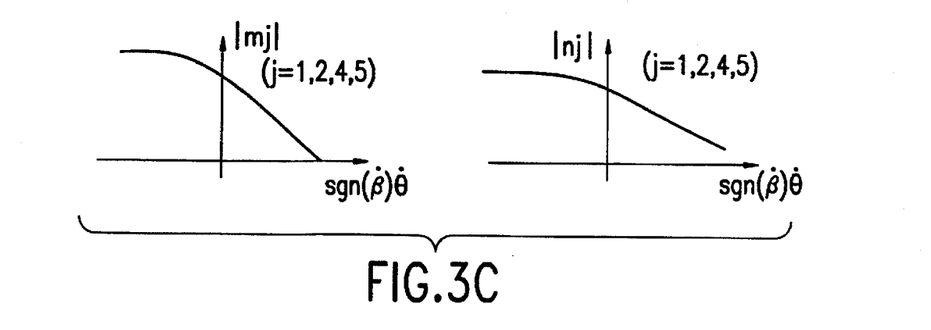
FIG. 3(C) is a set of graphs respectively showing the x-axis segment and y-axis segment in relation to a steering angle velocity of the front road wheels.
Figure 3D:
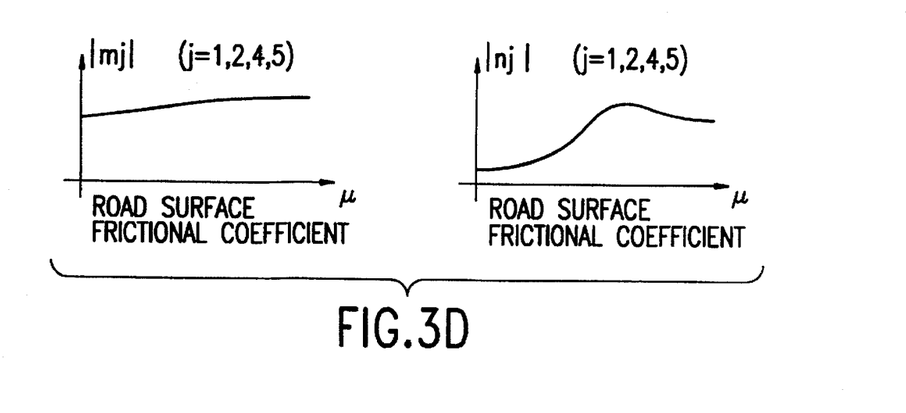
FIG. 3(D) is a set of graphs respectively showing the x-axis segment and y-axis segment in relation to a road surface friction coefficient.

Hereinafter, the operation of the hydraulic brake control system will be described with reference to the flow chart of FIG. 2. Assuming that the computer 70 has started to execute the control program of FIG. 2 in response to start of the vehicle, the computer 70 is applied with electric signals respectively indicative of a fore-and-aft velocity Vx, a lateral velocity Vy, a fore-and-aft acceleration Gx, a lateral acceleration Gy, a yaw rate γ, a steering angle θ of the front road wheels and a road surface frictional coefficient μ from the sensors 61-67 at step 102 and executes a low pass filter calculation at step 104 to eliminate high frequency noise components from the detected values Vx, Vy, Gx, Gy, γ, θ, μ. In this instance, the fore-and-aft acceleration Gx and lateral acceleration Gy may be calculated by time differentiation of the fore-and-aft velocity Vx and lateral velocity Vy, whereas the fore-and-aft velocity Vx and lateral velocity Vy may be calculated by time integration of the fore-and-aft acceleration Gx and lateral acceleration Gy. When the program proceeds to step 106, the computer 70 calculates a steering angle velocity dθ/dt by time differentiation of the detected steering angle θ and causes the program to proceed to step 108. Thus, the computer 70 calculates at step 108 a side slip angle β based on the following equation (3) and calculates at step 110 a side slip angular velocity dβ/dt based on the following equation (4).

$$\beta = Vy/Vx \quad (3)$$

$$d\beta/dt = \frac{(Gy - \gamma \cdot Vx) - \beta \cdot (\gamma \cdot Vy - Gx)}{Vx} \quad (4)$$

In this instance, the side slip angular velocity dβ/dt may be calculated by the following equation (5)

$$d\beta/dt = \frac{dVy/dt - \beta \cdot dVx/dt}{Vx} \quad (5)$$

Thereafter, the computer 70 determines at step 112 whether the side slip angular velocity dβ/dt is more than "0" or not. If the vehicle is in a straight traveling condition or a rightward turning condition, the computer 70 determines a "Yes" answer at step 112 and executes processing at step 114-120 to determine a minimum value Lm as a control variable for defining a target braking force F and to determine distribution ratios Kfl, Kfr, Krl, Krr of braking forces applied to the front and rear road wheels.

At step 114 of the program, the computer 70 defines the detected fore-and-aft velocity Vx as a vehicle speed V and calculates an x-axis segment m1, m2 and a y-axis segment n1, n2 with reference to tables where each absolute value mj, nj (j=1, 2, 4, 5) of an x-axis segment mj and a y-axis segment nj of the boundary line is memorized in relation to the vehicle speed V, the steering angle θ, the steering angle velocity dθ/dt and the road surface frictional coefficient μ as shown in FIGS. 3(A)-3(D), in this case, the tables are in the form of a five dimensional matrix where a value sgn(dβ/dt)·θ of the vehicle speed V and steering angle θ multiplied by a positive or negative sign sgn(dβ/dt) of the side slip angular velocity dβ/dt at every x-axis segments m1, m2, m3, m4 and y-axis segments n1, n2, n4, n5, a value sgn(dβ/dt)·dθ/dt of the steering angle velocity dθ/dt multiplied by a positive or negative sign sgn(dβ/dt) of the side slip angular velocity dβ/dt and the road surface frictional coefficient μ are memorized as variables. The table is preliminarily stored in a read-only memory or ROM of the computer 70. The respective absolute values |mj|, |nj|(j=1, 2, 4, 5) will change in relation to the variables V, sgn(dβ/dt)·θ, sgn(dβ/dt). dθ/dt, μ as shown in FIGS. 3(A)-3(D).

Thus, the computer 70 calculates at step 114 the values sgn(dβ/dt)·θ, sgn(dβ/dt)·dθ/dt on a basis of the steering angle θ, steering angle velocity dθ/dt and side slip angular velocity dβ/dt and reads out the respective absolute values of the segments |mj|, |nj|(j=1, 2) in relation to the variables V, sgn(dβ/dt)·θ, sgn(dβ/dt)·dθ/dt, μ. In this instance, the computer 70 reads out a plurality of values at each of the absolute values and obtains respective segment values m1, n1, m2, n2 by complementary calculation of the read out values. At the following step 116, the computer 70 calculates the vertical distances L1, L2 from the dynamic state P (β, dβ/dt) to the approximate lines X1, X2 on a basis of the equation (2) and sets the vertical distance L3 to the approximate line X3 as a side slip angular velocity dβ/dt. Thus, the computer 70 calculates at step 118 a minimum value Lm=MIN(L1, L3. L3) of the vertical distances L1-L3 and sets at step 120 braking force distribution ratios Kfl, Kfr, Krl, Krr of the front and rear road wheels as braking force distribution ratios Kfout, Kfin, Krout, Krin memorized in the computer 70 and allotted to the turning outside and inside front road wheels and the turning outside and inside rear road wheels. Although in this embodiment the braking force distribution ratios Kfout, Kfin. Krout, Krin are allotted with "1", "0", "0", "0", the distribution ratios can be varied to various values.

Figure 4:
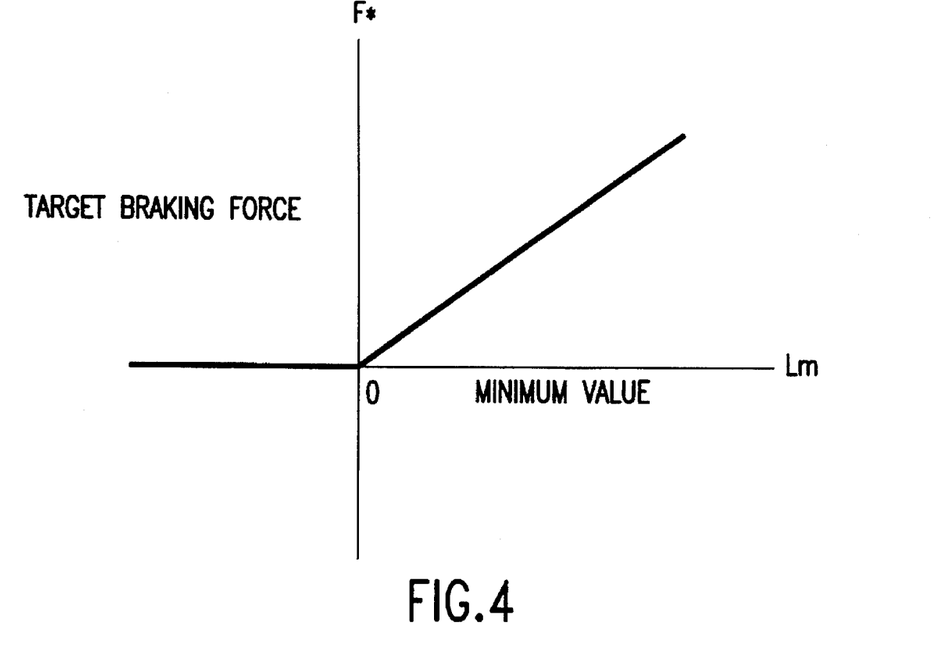
FIG. 4 is a graph showing a synthetic target braking force in relation to a minimum vertical distance from a dynamic state of the vehicle to the boundary line.

After calculation of the minimum value Lm and the braking force distribution ratios Kfl, Kfr, Krl, Krr, the computer 70 refers to a braking force table stored therein at step 130 to read out a synthetic target braking force F* corresponding with the minimum value Lm. As shown in FIG. 4, the synthetic target braking force F* is defined as "0" when the minimum value Lm is negative and is increased in accordance with the minimum value Lm when the minimum value Lm is positive. The fact that the minimum value Lm is negative represents that the dynamic state of the vehicle is in a stable region, and the fact that the minimum value Lm is positive represents that the dynamic state of the vehicle is in an unstable region. In this instance, the unstable degree of the dynamic state P of the vehicle is represented by the magnitude of the positive minimum value Lm. When the program proceeds to step 132, the computer 70 multiplies the synthetic target braking force F* by the braking force distribution ratios Kfl, Kfr, Krl, Krr and to calculate each target braking force of the front and rear road wheels F*fl=Kfl F*, F*fr=Kfr F*, F*rl=Krl F*, F*rr=Krr F*. Thus, the computer 70 produces a control signal for each control of the road wheels and applies it to the brake control circuit 80. If the target braking forces F*fl, F*fr, F*rl, F*rr each are "0", the control signal represents the fact that any control of the braking force is not required. If either one of the target braking forces F*fl, F*fr, F*rl, F*rr is positive, the control signal represents each target braking force of the road wheels.

When the dynamic state of the vehicle is in the stable region, the control signal represents the fact that any control of the braking is not required. When applied with the control signal, the brake control circuit 80 deenergizes all the solenoid valves 21, 23, 24, 31, 33, 34, 41, 43, 44, 51, 53, 54 to retain them as shown in their first positions. When the brake pedal 11 is depressed during travel of the vehicle in such a condition as described above, the hydraulic fluid under pressure discharged from the first port of master cylinder 12 is supplied to the slave cylinders 22, 32 through the solenoid valves 21, while the hydraulic fluid under pressure discharged from the second port of master cylinder 12 is supplied to the slave cylinders 42, 52 through proportioning valve 13 and solenoid valves 41, 51. Thus, the front and rear road wheels each are applied with a braking force in accordance with depression of the brake pedal to brake the vehicle.

If the dynamic state of the vehicle is in the unstable region in braking operation, the control signal represents each target braking force of the road wheels. When applied with the control signal, the brake control circuit 80 energizes the solenoid valves 21, 31, 41, 51 to switch over them to their second positions. As a result, the supply of hydraulic fluid under pressure from the master cylinder 12 to the slave cylinders 22, 32, 42, 52 is interrupted so that the slave cylinders 22, 32, 42, 52 are supplied with hydraulic fluid under pressure under control of the solenoid valves 23, 24, 33, 34, 43, 44 53, 54. Under such a condition, the brake control circuit 80 compares each target braking force F*fl, F*fr, F*rl, F*rr with respective braking forces Ba, Bb, Bc, Bd detected by the hydraulic pressure sensors 68a, 68b, 68c, 68d to apply the target braking forces to the front and rear road wheels under control of the solenoid valves 23, 24, 33, 34, 43, 44, 53, 54.

If the target braking forces F*fl, F*fr, F*rl, F*rr each are larger than the detected braking forces Ba, Bb, Bc, Bd, the brake control circuit 80 deenergizes the solenoid valves 23, 24, 33, 84, 43, 44, 53, 54 to connect the high pressure line L1 to the slave cylinders 22, 82, 42, 52 therethrough thereby to increase the hydraulic pressure in the slave cylinders. If the target braking forces F*fl, F*fr, F*rl, F*rr each are smaller than the detected braking forces Ba, Bb, Bc, Bd, the brake control circuit 80 energizes the solenoid valves 23, 24, 33, 34, 43, 44, 53, 54 to connect the low pressure line L2 to the slave cylinders 22, 32, 42, 52 therethrough to decrease the hydraulic pressure in the salve cylinders. If the target braking force F*fl, F*fr, F*rl, F*rr each are equal to the detected braking forces Ba, Bb, Bc, Bd, the brake control circuit 80 energizes the solenoid valves 23, 33, 43, 53 and deenergizes the solenoid valve 24, 84, 44, 54 to disconnect the slave cylinders 22, 32, 42, 52 from the high and low pressure lines L1 and L2 to maintain the hydraulic pressure in the slave cylinders. Accordingly, if the dynamic state $P(\beta, d\beta/dt)$ of the vehicle is in the unstable region during rightward turning of the vehicle, the left front road wheel is applied with a braking force in accordance with the unstable degree of the dynamic state of the vehicle. As a result, the vehicle is applied with a force in the leftward turning direction to decrease the side slip angle $\beta$ and its angular velocity $d\beta/dt$ thereby to return the dynamic state of the vehicle to the stable region.

If the side slip angular velocity $d\beta/dt$ is less than "0" or the vehicle is in a leftward turning condition, the computer 70 determines a "No" answer at step 112 of the control program and causes the program to proceed to step 122–128. At step 122, the computer 70 reads out respective absolute values |mj|, |nj| (j=4, 5) of the segments in relation to the vehicle speed V, the side slip angular velocity $d\beta/dt$, the steering angle velocity $d\beta/dt$, the steering angle $\theta$ of the front road wheels and the road surface frictional coefficient μ and complements them obtain segment values m4, n4, m5, n5 with negative signs. At the following step 124, the computer 70 calculates the vertical distances L4, L5 from the dynamic state $d\beta/dt$) to the approximate lines X4, X5 on a basis of the equation (2) and sets the vertical distance L6 from the dynamic state P to the approximate line X6 as a side slip angular velocity $-d\beta/dt>0$. Subsequently, the computer 70 calculates at step 126 a minimum value Lm=MIN(L4, L5, L6) of the vertical distances L4–L6 and sets at step 128 respective braking force distribution ratios Kfl, Kfr, Krl, Krr of the front and rear road wheels as the braking force distribution ratios Kfin, Kfout, grin, Krout memorized in the computer 70.

After processing at step 128, the computer 70 executes processing at step 130–134 to apply a control signal for each control of the braking forces of the road wheels to the brake control circuit 80. When the dynamic state $P(\beta, d\beta/dt)$ of the vehicle is in the stable region, the control signal represents the fact that any control of the braking force is not required. In this instance, the road wheels each are applied with a braking force in accordance with depression of the brake pedal 11 under control of the brake control circuit 80 in the same manner as described above. When the dynamic state $P(\beta, d\beta/dt)$ of the vehicle is in the unstable region, the control signal represents each target braking force F*fl, F*fr, F*rl, F*rr of the road wheels. When applied with the control signal, the hydraulic braking pressure control devices 20, 30, 40, 50 are operated under control of the brake control circuit 80 to apply the target braking forces F*fl, F*fr, F*rl, F*rr to the front and rear road wheels. Accordingly, if the dynamic state of the vehicle is in the unstable region in a leftward turning condition, the right front road wheel is applied with a braking force in accordance with the unstable degree of the dynamic state. As a result, the vehicle is applied with a force in the rightward turning direction to decrease the side slip angle $\beta$ and its angular velocity $d\beta/dt$ thereby to return the dynamic state of the vehicle to the stable region.

As is understood from the above description, the side slip angle $\beta$ of the vehicle is detected by processing at step 108, and the side slip angular velocity $d\beta/dt$ is detected by processing at step 110. Thus, if the dynamic state $P(\beta, d\beta/dt)$ of the vehicle defined by the side slip angle $\beta$ and its angular velocity $d\beta/dt$ is in the unstable region, the hydraulic braking pressure control devices 20, 30, 40, 50 are operated under control of the brake control circuit 80 by processing at step 116–120 or 124–128 and 130–134 to return the dynamic state of the vehicle to the stable region. in this embodiment, a driving condition amount of the vehicle such as the vehicle speed V, the steering angle $\theta$ and the steering angle velocity $d\theta/dt$ related to stability of the vehicle in a lateral direction is detected by the fore-and-aft velocity sensor 61, the steering angle sensor 66 and processing at step 106, and a travel circumstance condition amount related to stability of the vehicle in the lateral direction is detected by the road surface frictional coefficient sensor 67. Based on a result of the detection, the boundary line of the stable and unstable regions is varied by processing at step 114 and 122. Thus, the dynamic behavior of the vehicle can be corrected in accordance with the driving condition or the travel circumstance.

In the above embodiment, the processing at step 116, 118 or 124, 126 is executed to determine whether the dynamic state of the vehicle is in the stable region or the unstable region and to calculate the unstable degree of the dynamic state, the processing at step 130, 132 is executed to determine a control amount of the braking force for correction of the dynamic state in accordance with the unstable degree, and the processing at step 134 is executed to produce a control signal indicative of the control amount and apply it to the brake control circuit 80. Thus, the hydraulic braking pressure control devices are operated under control of the brake control circuit 80 to correct the dynamic state of the vehicle in accordance with the unstable degree.

Although in the above embodiment the vehicle speed V, steering angle $\theta$ and steering angle velocity $d\theta/dt$ are detected as a driving condition amount related to stability of the vehicle in a lateral direction, and the road surface frictional coefficient μ is detected as a travel circumstance amount of the vehicle, other physical amounts may be replaced with or added to the physical amounts V, $\theta$, $d\theta/dt$.

Figure 5:
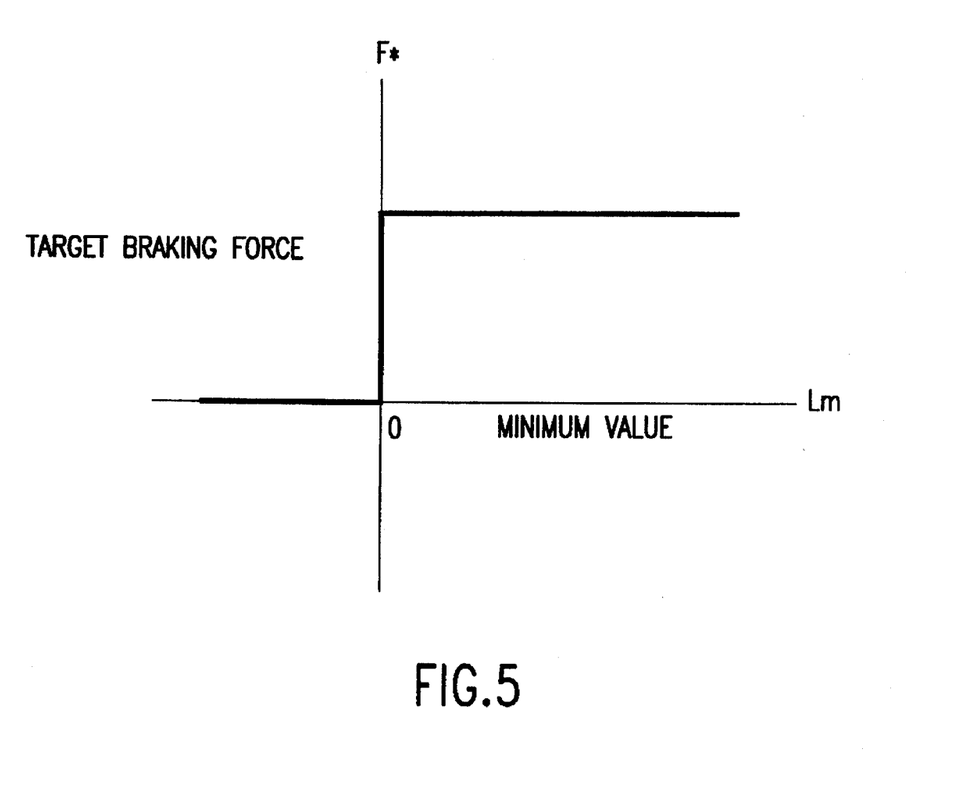
FIG. 5 is a graph showing a synthetic target braking force in relation to the minimum vertical distance in a modification.

For example, a physical amount related to each slip ratio of the front and rear road wheels and a stability factor of the vehicle may be replaced with the physical amounts. Although in the above embodiment, the control amount of the braking force is varied in accordance with the unstable degree of the dynamic state of the vehicle, the braking force may be controlled in a constant amount regardlessly of the unstable degree. in such a case, the variation characteristic of the synthetic target braking force F* shown in relation to the minimum value Lm in FIG. 4 is modified as shown in FIG. 5.

Although in the above embodiment, the hydraulic brake control system has been adapted as the dynamic behavior control apparatus of the vehicle, the suspension system of the vehicle may be adapted as the dynamic behavior control apparatus to control the roll stiffness distribution of the vehicle in a fore-and-aft direction. in such a case, the damping force of the suspension system may be controlled in accordance with the minimum value Lm calculated by processing at step 118 or 126.

What is claimed is:

1. A dynamic behavior control apparatus of an automotive vehicle having a behavior control device for stabilizing unstable behavior of the vehicle, first detection means for detecting a side slip angle of the vehicle, second detection means for detecting a side slip angular velocity of the vehicle, and electric control means for controlling operation of the behavior control device when a dynamic state of the vehicle defined by the detected side slip angle and its angular velocity is in an unstable region, comprising:

third detection means for detecting a driving condition amount related to stability of the vehicle in a lateral direction; and means for varying the unstable region in accordance with the detected driving condition amount.

2. A dynamic behavior control apparatus of an automotive vehicle having a behavior control device for stabilizing unstable behavior of the vehicle, first detection means for detecting a side slip angle of the vehicle, second detection means for detecting a side slip angular velocity of the vehicle, and electric control means for controlling operation of the behavior control device when a dynamic state of the vehicle defined by the detected side slip angle and its angular velocity is in an unstable region, comprising:

third detection means for detecting a travel circumstance condition amount related to stability of the vehicle in a lateral direction; and means for varying the unstable region in accordance with the detected travel circumstance condition amount.

3. A dynamic behavior control apparatus of an automotive vehicle comprising:

a behavior control device for stabilizing unstable behavior of the vehicle;

first detection means for detecting a side slip angle of the vehicle;

second detection means for detecting a side slip angular velocity of the vehicle;

third detection means for detecting a driving condition amount related to stability of the vehicle in a lateral direction; and electric control means for controlling operation of the behavior control device when a dynamic state of the vehicle defined by the detected side slip angle and the detected angular velocity is in an unstable region, wherein said electric control means comprises:

means for varying the unstable region in accordance with the detected driving condition amount;

calculation means for calculating an unstable degree within the unstable region of the dynamic state of the vehicle;

determination means for determining a control amount which is increased proportionally with an increase of the unstable degree; and output means for producing an electric control signal indicative of the control amount and applying it to said electric control means.

4. The dynamic behavior control apparatus of an automobile vehicle as set forth in claim 3, wherein said calculation means for calculating an unstable degree utilizes at least one of a travel circumstance condition amount and a driving condition amount in calculating the unstable degree.

5. A dynamic behavior control apparatus of an automotive vehicle comprising:

a behavior control device for stabilizing unstable behavior of the vehicle;

first detection means for detecting a side slip angle of the vehicle;

second detection means for detecting a side slip angular velocity of the vehicle;

third detection means for detecting a travel circumstance condition amount related to stability of the vehicle in a lateral direction; and electric control means for controlling operation of the behavior control device when a dynamic state of the vehicle defined by the detected side slip angle and the detected angular velocity is in an unstable region, wherein said electric control means comprises:

means for varying the unstable region in accordance with the detected travel circumstance condition amount;

calculation means for calculating an unstable degree within the unstable region of the dynamic state of the vehicle;

determination means for determining a control amount which is increased proportionally with an increase of the unstable degree; and output means for producing an electric control signal indicative of the control amount and applying it to said electric control means.

* * * * *